Patented Dec. 6, 1938

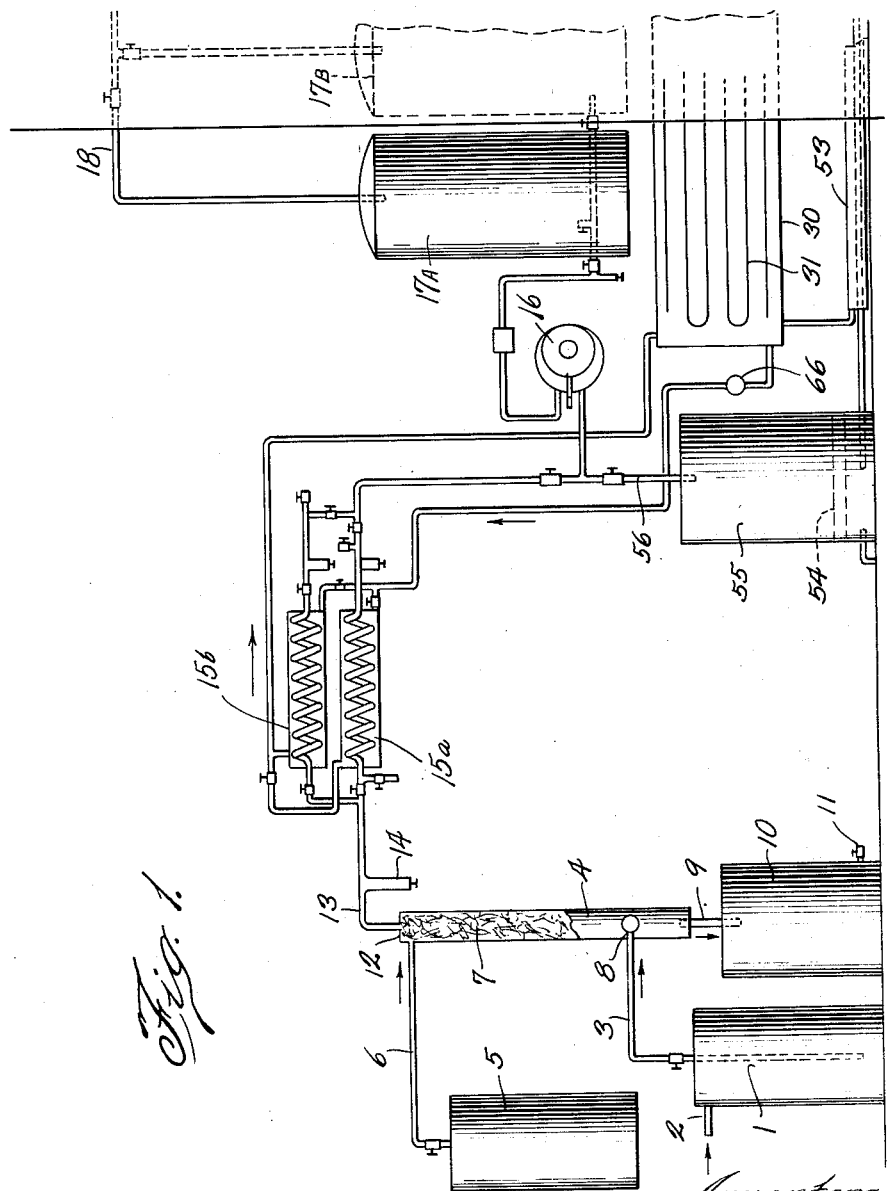

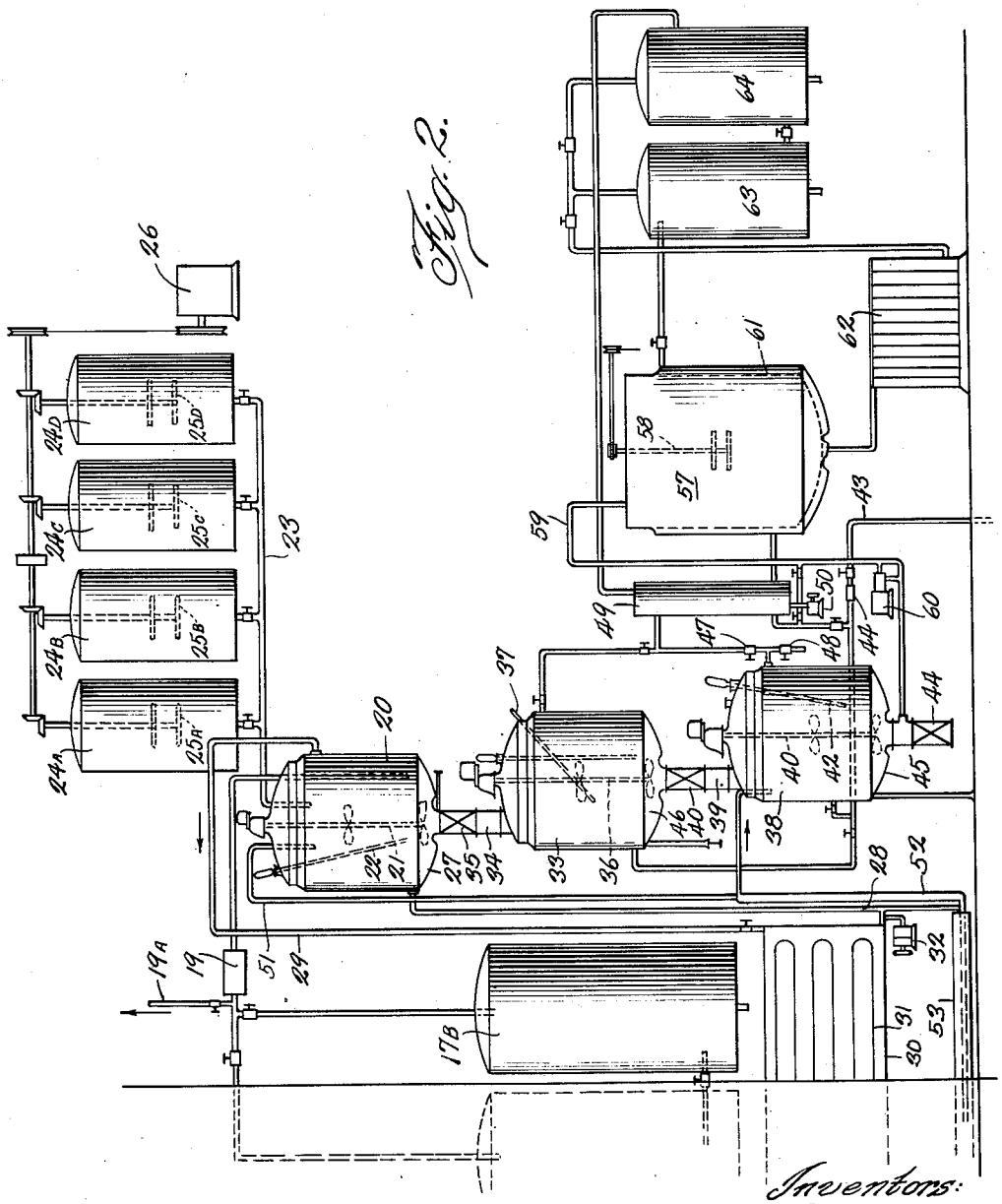

2,138,932

UNITED STATES PATENT OFFICE 2,138,932

PLANT AND PROCESS FOR MANUFACTURING RUBBER HYDROCHLORIDE

Eugene W. Moffett and Herbert A. Winkelmann, Chicago, Ill., and Floyd E. Williams, Gary, Ind., assignors to Marbon Corporation, a corporation of Delaware Application November 14, 1935, Serial No. 49,796

7 Claims. (Cl. 260—1)

This invention relates to a system and plant for manufacturing rubber hydrohalides.

An object of this invention is to manufacture rubber hydrohalides on a large scale.

Another object is to produce rubber hydrohalides by a continuous or semi-continuous process.

The invention in its broad aspect comprises a combination of means for supplying hydrogen chloride under pressure to rubber or rubber solutions, cooling the rubber or rubber solutions, reacting the hydrogen chloride under pressure with the rubber and recirculating the unreacted hydrogen chloride.

One of the most important steps in the production of rubber hydrochloride is the obtaining of the hydrogen chloride under pressure. Hydrogen chloride, as is well known, is extremely corrosive. However, it has been discovered that if the hydrogen chloride is in an anhydrous state it may be compressed without excessive corrosion by compressors made of hydrochloric acid resistant metals, and may even be compressed commercially with ferrous metal or alloy steel compressors.

The hydrogen chloride may be dried by anhydrous sulfuric acid, anhydrous calcium chloride, refrigeration or other means.

In the invention, as illustrated in the diagrammatic drawings in Fig. 1, the hydrogen chloride is dried by sulfuric acid and refrigeration, and the dry gas is compressed directly or through a storage and equalizing tank into the reaction vessel. However, by an alternative method, which is the preferred method where solid rubber is to be reacted with liquefied hydrogen chloride or gaseous hydrogen chloride under high pressures, the hydrogen chloride is compressed at about —40° C. and liquefied, or the hydrogen chloride may be liquefied at atmospheric pressure by cooling the gas to below —85° C. The liquefied hydrogen chloride is then used to create gaseous hydrogen chloride under any desired pressure or it is used directly either at atmospheric pressure, or at superatmospheric pressure.

The system as shown in Fig. 1 comprises the generating, drying, compressing and recirculating of the hydrogen chloride. In Fig. 2 there is shown the combination of apparatus used in producing the rubber hydrochloride and rubber hydrochloride solutions. The invention may be better understood by referring to the drawings in which the apparatus are illustrated diagrammatically. Considering the system from left to right, starting with Fig. 1 and proceeding to Fig. 2, there is shown a container (1) adapted to hold, for example, about 300 gallons of hydrochloric acid. It is of steel lined with Vultex rubber and has a top bolted securely to retain sufficient air pressure, admitted at 2 to cause the flow of the acid through pipe 3 and column 4. A sulfuric acid tank 5, similar to tank 1 except that it need not be rubber lined, is connected by a pipe 6 into column 4. Column 4 is made of stoneware and contains circles of stoneware 7 through which passes the sulfuric acid from tank 5 to remove the moisture from the hydrochloric acid entering the column at point 8 from tank 1. Spent acid drops through opening 9 into tank 10. Tank 10 is a seventy-five gallon glass lined kettle into which the spent acid from column 4 passes in order that the 5% or so of hydrogen chloride contained in the spent acid can be recovered. The hydrogen chloride gas having been dried by the sulfuric acid passes out of the column 4 through opening 12 into the pipe line 13. Any liquid present is caught in the pyrex glass trap 14.

The installation represented by 1 to 10 of the size designated will generate about fifty pounds of dry hydrogen chloride per hour. However, as heretofore stated, other means of generating or obtaining dry hydrogen chloride may be used, and the invention is not limited to the particular method or details illustrated.

The hydrogen chloride gas coming from the tower 4 still contains a small percentage of water, probably mostly in the form of the hydrate of hydrogen chloride. One method of removing the water is to pass the gas through a cooling system arranged in duplicate so that the water or hydrogen chloride hydrate condensed or solidified in one system can be removed by defrosting and blowing without disturbing the continuity of the process for making rubber hydrochloride. The system consists of coils for the hydrogen chloride gas surrounded by a cooling jacket 15 through which cold brine is circulated. The brine should be at a sufficiently low temperature, —25° being sufficient. However, anhydrous sulfuric acid bubbling towers may be used in place of the illustrated cooling system with satisfactory drying.

The dry hydrogen chloride gas is admitted into a compressor 16, which is preferably a rotary type compressor being positively sealed so that no air with its consequent moisture can mix with the hydrogen chloride. The use of a compressor which will not allow the admittance of air and moisture is of importance.

In accordance with the illustrated drawings the compressor is used to pump the hydrogen chloride gas at about 200–240 pounds per sq. in. pressure into the storage and equalizing tanks 17A and 17B, and thence through a reducing valve 19 into the reactor 20. However, in one modification of this invention the gas is compressed at about —40° C. to liquid hydrogen chloride, and the liquid hydrogen chloride used to create gas under pressure. The gas may also be cooled at atmospheric pressure to below −85° C. to obtain liquefied hydrogen chloride. The use of liquid hydrogen chloride has certain advantages, including ease of removal of air from the system, which makes it at least the equal of the more direct methods of producing hydrogen chloride gas under pressure. Furthermore, the use of liquefied hydrogen chloride is of particular advantage where hydrogen chloride under high pressure of 300 pounds per square inch or more is required, such as is necessary in the reaction of solid rubber with gaseous hydrogen chloride. In such cases the liquid is stored in the storage tanks and the pressure of the gas regulated by heating or cooling the contents. The storage tanks are jacketed and insulated. The gas required for the reaction with solid rubber in the bomb is led through line 19A into the reaction bomb (not shown), and recirculated by a similar system as shown for the solution system hereinafter described. The gas required for the rubber solutions is led through reducing valve 19 where it is reduced to about 10 pounds per square inch, and thence into the solution reactor 20.

The reactor 20 is a glass lined tank in which is a standard lightening mixer 21, including an agitator with fins attached, and with sleeve designed to withstand substantial pressure at the point where the agitator enters the tank. A thermometer well 22 is also inserted through the top of the reactor. The reactor 20 is connected by pipe line 23 with four mixing tanks, 24A, 24B, 24C and 24D, having stirrers 25A, 25B, 25C and 25D, run by motor 26. The reactor 20 also has a jacket 27 which is connected by inlet pipe 28 and outlet pipe 29 to a brine box 30, having cooling coils 31. A recirculating pump 32 is used to circulate the brine.

A glass lined ripening tank 33 is connected to the reactor 20 by pipe 34, having therein an 8 inch glass lined valve 35. This ripening tank has a stirrer 36 and a sampling tube 37.

A glass lined neutralizing tank 38 similar to reactor 20 and ripening tank 33 is connected by pipe 39 having valve 40 to the ripening tank. This neutralizing tank has a stirrer 41 and thermometer well 42 similar to the reactor.

A cold city water line 43 and a pressure reducing valve 44 allow cold city water to enter the jacket 45 of the neutralizer and the jacket 46 of the ripener. The cold water may be drawn off from the jackets through valves 47 and 48.

A gas exhaust pipe 51 from reactor 20 merges with gas exhaust line 52 from neutralizing tank 38. The gas exhaust line passes through a 4 inch steel tube 53 in which is circulated brine for the purpose of cooling the gas contained in exhaust line 52 sufficiently for it to condense out moisture. More moisture is removed when the gas passes through the absorbent bed 54 in storage tank 55.

Storage tank 55 is a nickel clad tank which is used as a reservoir for the dry exhaust gas. A valve pipe line 56 connects this reservoir with compressor 15, which may be used for continuously drawing off and recirculating the exhaust gas from reactor 20 and tank 38 while the reaction in tank 20 is taking place.

A storage tank 57 for the neutralized solution having stirrer 58 is connected to the neutralizing tank 38 by means of pipe line 59 having therein a booster pump 60. The storage tank has a jacket 61 through which water may be circulated as for tanks 33 and 38.

A filter press 62 is connected to the storage tank 57 for filtering the neutralized solutions.

Two jacketed tanks 63 and 64 for storing filtered solutions are connected to the filter press.

The production of rubber hydrochloride by means of the illustrated combination of apparatus may be carried out as follows: Rubber is mixed with a 50–50 mixture by volume of toluene and benzol in mixers 24 to form a 5% solution. About 200 gallons of the solution is flowed into the reactor 20. Brine at −40° C. is circulated through the jacket 27 and at the same time hydrogen chloride gas at about 10 pounds pressure is flowed into the reactor 20. The solution is agitated during the reaction. The reaction of the gas with the rubber solution and the cooling of the solutions take place together, thus causing the first part of the reaction to take place at a higher temperature than the latter part. A more regular reaction and a purer product results from this procedure. Preferably the first part of the reaction takes place with solutions at or around room temperature, and the latter part of the reaction with solutions at or around −10° C. The pressure on the hydrogen chloride gas is maintained throughout the reaction. After gas absorption of about two hours with agitation, the solution, which is then a solution of rubber hydrochloride at a temperature of about −8° to −12° C., is flowed into tank 33 where it is permitted to ripen for one additional hour. During the ripening cold city water is circulated through the jacket of tank 33. When the contents of tank 20 are emptied into tank 33, rubber solution is flowed into tank 20 and the reaction with hydrogen chloride continued. The ripened solution is flowed into tank 38 and the solution agitated and neutralized with soda ash which is admitted through opening 65. Hot water at about 140–160° F. may be circulated through the jacket of tank 38 prior to and during the neutralization. The excess hydrogen chloride gas evolved in tank 38 is evacuated through exhaust lines 52 where it merges with excess unabsorbed hydrogen chloride coming from the tank 33. This excess exhaust hydrogen chloride is dried by refrigeration and absorption in 53 and 54 respectively, admitted to the compressor in its anhydrous state and recirculated. After neutralization the solution is pumped into storage tank 57, and may be filtered when needed for such uses as the production of clear, transparent films or coatings.

The combination of herein described apparatus is seen to allow the continuous or semi-continuous production of solutions of rubber hydrochloride, since as soon as one rubber solution is reacted and flowed into the ripener, another solution is admitted to the reactor for reaction with hydrogen chloride. The exhaust hydrogen chloride from the ripening and neutralizing tanks is continuously circulated back to the storage tanks and thence to the reactor. Although it is preferred to run the apparatus continuously, the process may also be carried out as a batch process.

One of the most important stages in the processes is the compression of the hydrogen chloride. In order that this may be accomplished without excessive corrosion the hydrogen chloride is sent to the compressor in an anhydrous state. The compressor is of a type which will pump gas without allowing the admission of any air, which is particularly harmful due to moisture being present with it. Any type of compressor including a reciprocating type compressor which has a satisfactory seal to prevent the admission of air may be used. The rotary compressors of the so-called "Rollator" type used in pumping sulfur dioxide for refrigerators are made with a seal which is particularly air tight and in general have been found to give very satisfactory results in compressing hydrogen chloride.

It is to be understood that many details may be varied without departing from the spirit of this invention. The sizes, shape and types of apparatus may be widely varied. Any means for supplying gas under pressure may be used. It is within the bounds of this invention to supply hydrogen chloride under pressure by means of liquefied hydrogen chloride, and recover and reuse exhaust hydrogen chloride by liquefaction or by the use of a compressor to recirculate the gas. It is preferred to use liquefied hydrogen chloride to supply gas to the reactor and use a compressor to recirculate the excess gas. By this means smaller quantities of gas need be dried and corrosion difficulties are lessened.

Although the combination of apparatus described is particularly suitable for the use and production of solutions, the use of undissolved rubber and the direct production of undissolved or solid rubber hydrochloride is possible through adaptions apparent from this specification. Generally, however, higher pressures of about 300 pounds and 50% of equilibrium pressure should be used with undissolved rubber. The gas supply for this system is led through line 19A into a series of jacketed high pressure bombs, not shown in the drawings. Cold brine or a hot fluid may be circulated in the jackets depending on whether it is desired to carry out the reaction at a low temperature or not. The use of a hot fluid is also of advantage in heating the contents of the reaction vessel to remove absorbed hydrogen chloride from the mass after completion of the reaction. The excess hydrogen chloride from the bombs after completion of the reaction is removed and stored in the main system for reuse. The excess hydrogen chloride from one bomb may also be admitted to a bomb containing unreacted solid rubber, or it may be reduced in pressure and admitted to the reactor containing solutions of rubber without first being returned to the storage tanks.

Various other modifications and combinations of the apparatus and circulation system will become apparent from this specification, and the invention is not intended to be limited by the illustrative examples and drawings except as may be necessitated by the prior art. Although more satisfactory results are obtained by having separate vessels for the ripening and neutralizing, the two processes may be carried out in a single vessel. Furthermore, halogenated rubber, halogenated hydrohalogenated rubber and other halogen containing butadiene polymers may be produced in the above described plant and system by suitable modifications, although the plant and system is particularly adapted for the production of rubber hydrochloride.

We claim:

1. The method of making hydrohalogenated rubber which comprises subjecting a solution of rubber to the action of hydrogen chloride in a reaction vessel thereby producing a solution of hydrohalogenated rubber, flowing the solution of hydrohalogenated rubber into a second vessel, adding a solution of rubber to the reaction vessel, removing the unreacted hydrogen chloride from the solution of hydrohalogenated rubber and recirculating said hydrogen halide into the reactor.

2. The method of making rubber hydrohalides which comprises subjecting a solution of rubber to the action of a hydrogen halide in a reaction vessel, thereby producing a solution of hydrohalogenated rubber, flowing the solution of hydrohalogenated rubber into a second vessel, adding a solution of rubber to the reaction vessel, and introducing a hydrogen halide into the solution of rubber in the reaction vessel while the solution of hydrohalogenated rubber is in the process of treatment.

3. The method of making rubber hydrohalides which comprises subjecting a solution of rubber to the action of a hydrogen halide in a reaction vessel, thereby producing a solution of hydrohalogenated rubber, flowing the solution of hydrohalogenated rubber into a second vessel, removing the unreacted hydrogen halide from the solution of hydrohalogenated rubber, adding a solution of rubber to the reaction vessel and introducing a hydrogen halide into the solution of rubber while the unreacted hydrogen halide is being removed from the solution of hydrohalogenated rubber.

4. The method of making a rubber hydrochloride which comprises subjecting a solution of rubber in a reaction vessel to gaseous hydrogen chloride under pressure to produce a solution of hydrochlorinated rubber, flowing the solution of hydrochlorinated rubber into a second vessel, ripening said solution of hydrochlorinated rubber, flowing a solution of rubber into the reaction vessel, introducing gaseous hydrogen chloride under pressure into the solution of rubber in the reaction vessel while the solution of hydrochlorinated rubber is being ripened, flowing the solution of ripened rubber hydrochloride into a third vessel, flowing the reacted rubber from the reaction vessel into the second vessel, flowing a solution of rubber into the reaction vessel, removing unreacted hydrogen chloride from the solutions in the second and third vessel, and recirculating the unreacted hydrogen chloride.

5. The process of making rubber hydrochloride which comprises compressing a gaseous hydrogen chloride, subjecting rubber to the action of said hydrogen chloride, cooling the rubber while the reaction takes place, removing the unabsorbed gas, drying the gas, and recirculating the gas into the reactor.

6. The process of making rubber hydrochloride which comprises subjecting rubber at an elevated temperature to the action of gaseous hydrogen chloride for a short time interval which is insufficiently long to completely react the rubber, cooling the rubber to a lower temperature, and subjecting the cooled incompletely reacted rubber to the further action of hydrogen chloride.

7. The process of making rubber hydrochloride which comprises subjecting a rubber solution at an elevated temperature to the action of gaseous hydrogen chloride for a short time interval which is insufficiently long to complete the reaction, and cooling the solution to a lower temperature while continuing the reaction.

EUGENE W. MOFFETT.
FLOYD E. WILLIAMS.
HERBERT A. WINKELMANN.